(12) United States Patent
Reichert et al.

(10) Patent No.: US 10,287,001 B2
(45) Date of Patent: May 14, 2019

(54) SELF-ADJUSTING SYSTEM FOR AIRCRAFT CONTROL

(71) Applicant: Kitty Hawk Corporation, Mountain View, CA (US)

(72) Inventors: Todd Reichert, Mountain View, CA (US); Zachais Vawter, Sunnyvale, CA (US); Joseph Roop, Sunnyvale, CA (US); Mark Johnson Cutler, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 297 days.

(21) Appl. No.: 15/183,697

(22) Filed: Jun. 15, 2016

(65) Prior Publication Data

US 2017/0361920 A1    Dec. 21, 2017

(51) Int. Cl.
*B64C 13/02* (2006.01)
*G05D 1/10* (2006.01)

(52) U.S. Cl.
CPC ............. *B64C 13/02* (2013.01); *G05D 1/101* (2013.01)

(58) Field of Classification Search
None
See application file for complete search history.

(56) References Cited

U.S. PATENT DOCUMENTS

| | | |
|---|---|---|
| 7,831,351 B1 | 11/2010 | Hofer |
| 8,527,118 B2 | 9/2013 | Jones |
| 2008/0096657 A1 | 4/2008 | Benoist |
| 2009/0187292 A1* | 7/2009 | Hreha ..................... B64C 13/04 701/4 |
| 2010/0141198 A1* | 6/2010 | Krah ....................... G05B 11/28 318/636 |
| 2015/0367937 A1 | 12/2015 | Greenfield et al. |
| 2016/0030835 A1 | 2/2016 | Argiro |
| 2016/0375982 A1* | 12/2016 | Rifenburgh ............. B64C 13/04 244/17.19 |

FOREIGN PATENT DOCUMENTS

WO    WO2016082014    6/2016

* cited by examiner

*Primary Examiner* — Tamara L Weber
(74) *Attorney, Agent, or Firm* — Van Pelt, Yi & James LLP

(57) ABSTRACT

A self-adjusting flight control system is disclosed. In various embodiments, an input interface receives an input signal generated by an inceptor based at least in part on a position of an input device comprising the inceptor. A processor coupled to the input interface determines dynamically a mapping to be used to map input signals received from the inceptor to corresponding output signals associated with flight control and uses the determined mapping to map the input signal to a corresponding output signal. The processor determines the mapping at least in part by computing a running average of the output signal over an averaging period and adjusting the mapping at least in part to associate a neutral position of the input device comprising the inceptor with a corresponding output level that is determined at least in part by the computed running average.

20 Claims, 8 Drawing Sheets

SELF-ADJUSTING SYSTEM FOR AIRCRAFT CONTROL

BACKGROUND OF THE INVENTION

Helicopters and other aircraft are known, but typically such aircraft have required highly trained pilots to operate them. Air travel accessible to non-pilots for casual use and/or recreation, such as to commute to work, run an errand, visit a friend, take a ride for fun, etc., have been imagined, but to date aircraft have not been provided that would enable such a casual, non-pilot user to operate the aircraft.

Aircraft typically have a number of manual control devices, sometimes referred to herein as "inceptors", which enable a person piloting the aircraft to provide manual input that is transmitted in the form of electrical signals, e.g., voltage levels, to a specialized computer called a "flight controller". The inputs to the flight controller typically take the form of one or more of the following: pitch, roll, yaw, and throttle. The inputs typically are translated by the flight controller into control signals sent to propulsion engines (e.g., motors or engines that drive propellers, rotors, etc.) and control surfaces, such as flaps, rudders, and airfoil (e.g., wing, rotor blade, etc.) pitch.

To be practical for flight by non-pilots, an aircraft may need to have fewer degrees of freedom and/or fewer "high gain" (or high attention) tasks to be accomplished at the same time. One simplification that may be advantageous may be automatic altitude maintenance once the aircraft is at a desired altitude. Altitude hold techniques have been developed for and used in drone aircraft, for example, but typically such techniques depend on sensors (e.g., GPS, accelerometer, radar, pressure altimeters, or other sensors), which may not be considered sufficiently reliable for use (without backup) in aircraft intended for human flight.

Automatic trim control systems for helicopters have been provided. Such systems may, for example, use servomotors or other devices to physically hold, move, and/or preload cyclic or other manual controls, as required, to eliminate the need for the pilot to maintain a constant trim force against the inceptor.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-adjusting system for aircraft control is disclosed. In various embodiments, a flight control system adjusts itself, automatically, to change how inceptor (manual flight control input device) inputs are mapped to corresponding outputs, e.g., by associating a "center" or other "neutral" position of an inceptor to a dynamically determined corresponding output. In some embodiments, the flight control system computes a running average, e.g., over a fixed, rolling window (e.g., the last 4 seconds), and maps the center or other neutral position to the computed average output position. In some embodiments, techniques disclosed herein may be used to "learn" and associate with the center/neutral position of a throttle control an output level (e.g., voltage to electric motors driving the aircraft's rotors) associated with maintaining altitude and/or a steady state rate of ascent or descent.

Figure 1A:
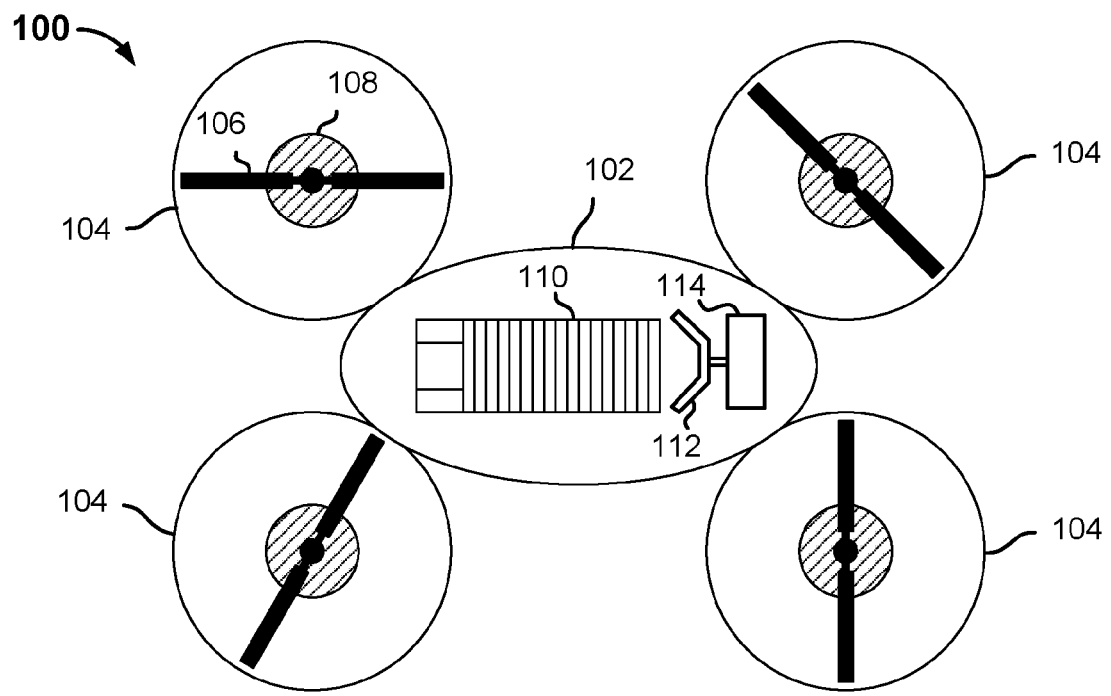
FIG. 1A is a block diagram illustrating a top view of an embodiment of an aircraft.

FIG. 1A is a block diagram illustrating a top view of an embodiment of an aircraft. In various embodiments, a self-adjusting flight control system as disclosed herein may be embodied in an aircraft such as the aircraft 100 of FIG. 1A. In the example shown, aircraft 100 includes a cabin 102 situated in a center portion of aircraft 100. Four rotor housings 104 are shown position around the cabin 102. Each includes an upper rotor 106 and associated motor 108. In various embodiments, one or more of the cabin 102, rotor housings 104, rotors 106 and/or motor 108 may be mounted on or to a frame (not shown). In the example shown, cabin 102 includes a seat 110 configured to accommodate a single human occupant and a handle bar style flight control 112 mounted on a base 114.

In various embodiments, flight control 112 may have one or more thumb-operated or other inceptors mounted thereon. For example, flight control 112 may have a left side thumb operated small scale joystick or other inceptor to receive input associated with two degrees of freedom (e.g., pitch and roll) and a right side inceptor associated with two other inputs (e.g., yaw and throttle). A flight control system comprising components mounted on or in base 114 may receive inputs provide via such inceptors and in response provide outputs to control the attitude, altitude, and/or speed of aircraft 100, for example by controlling the respective speed of the various motors 108.

Figure 1B:
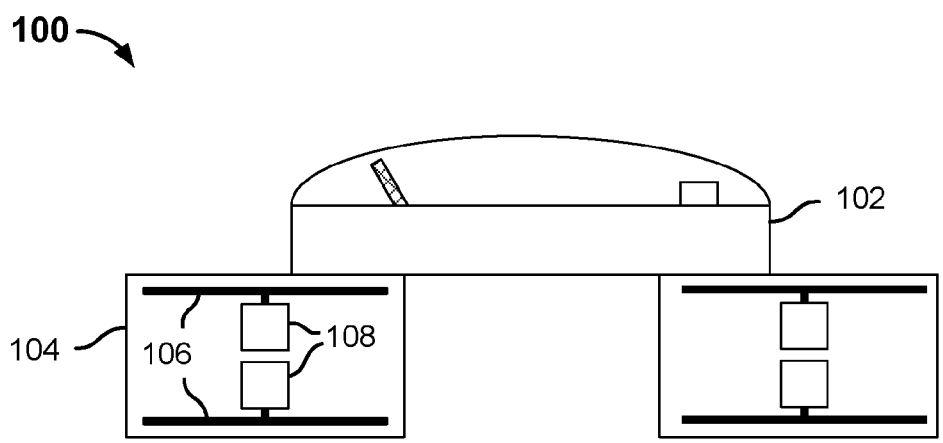
FIG. 1B is a block diagram illustrating a side view of an embodiment of the aircraft 100 of FIG. 1A.

FIG. 1B is a block diagram illustrating a side view of an embodiment of the aircraft 100 of FIG. 1A. In the example shown, aircraft 100 is seen to include in each rotor housing 104 an upper rotor 106 driven by an associated upper motor 108 and a lower rotor 106 driven by an associated lower motor 108. The aircraft 100 is therefore, in this example, an eight rotor aircraft, sometimes referred to as an "octocopter". Such an aircraft uses a flight control system to receive inputs provide by a pilot via one or more inceptors and provide outputs to the respective motors 108, e.g., to drive each at a speed computed to result in the rotors 106 collectively maintaining one or more of the attitude, altitude, and speed of the aircraft 100.

Figure 2:
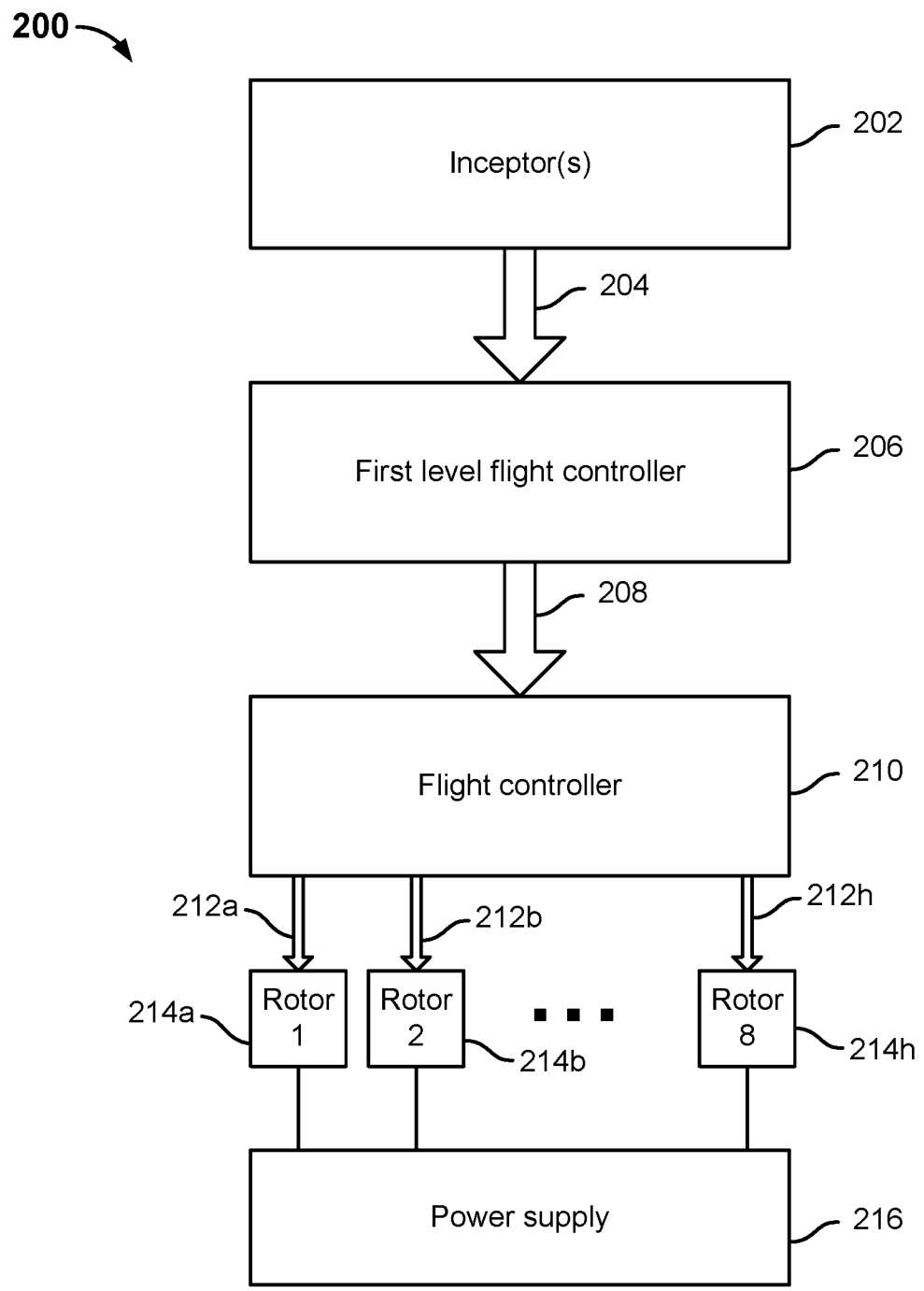
FIG. 2 is a block diagram illustrating an embodiment of a self-adjusting flight control system.

FIG. 2 is a block diagram illustrating an embodiment of a self-adjusting flight control system. In various embodiments, the flight control system 200 of FIG. 2 may be used to control an aircraft such as aircraft 100 of FIGS. 1A and 1B. In the example shown, flight control system 200 includes a set of one or more inceptors 202, each configured to receive manual input and provide a corresponding electrical output or set of outputs 204 (e.g., voltages each corresponding to displacement in an associated axis/direction). The outputs 204 are provided as inputs to a first level flight controller 206 in this example. In various embodiments, first level flight controller 206 maps the input(s) 204 to a corresponding set of flight control signals 208, such as pitch, roll, yaw, and throttle inputs, to a conventional flight controller 210. Flight controller 210 determines based at least in part on the signals 208 corresponding control signals 212 (represented in the example shown by signals 212a, 212b, and 212h) to control the speed at which each of the respective rotors 214 (represented in the example shown by rotors 214a, 214b, and 214h) is driven. Each of the rotors 214 is powered by an associated power supply 216, e.g., a battery or other power source.

In various embodiments, the first level flight controller 206 includes a mapping module (not shown in FIG. 2) that maps the respective input signals 204 received from the inceptor(s) or other manually-operated flight control(s) to corresponding flight controller inputs 208. In various embodiments, the flight control system 200 is self-adjusting in that a center or other neutral position of one or more inceptor(s) 202 may be remapped dynamically to a different corresponding output 208. For example, in some embodiments, to maintain altitude (or a steady state rate of ascent or descent) without require constant active manipulation of a throttle control/inceptor, the first level flight controller 206 dynamically adjusts the mapping of a throttle input 204 to a corresponding output 208 in a manner such that the output 208 associated with a center/neutral level of input 204 is at a level required to maintain the desired altitude (or steady state rate of ascent/descent).

In some embodiments, remapping may be performed at least in part by computing a running average, e.g., over a moving window of fixed size, such as the last 4 seconds, of the appropriate output 208, and dynamically adjusting mapping such that the corresponding input 204 associated with a center/neutral position of the corresponding inceptor maps to the computed average output. In various embodiments, as a result, if the inceptor is allowed to return to the center/neutral position, the current altitude (or steady state rate of ascent/descent) may be maintained, despite variables that may change over time, such as the weight of the occupant and/or other payload in the aircraft, the current level of power in a battery or other power supply 216, etc.

While the first level controller 206 is shown in FIG. 2 as a separate module, interposed between the inceptor(s) 202 and the flight controller 210, in some alternative embodiments the self-adjusting mapping disclosed as herein may be performed by elements integrated into the flight controller 210.

Figure 3:
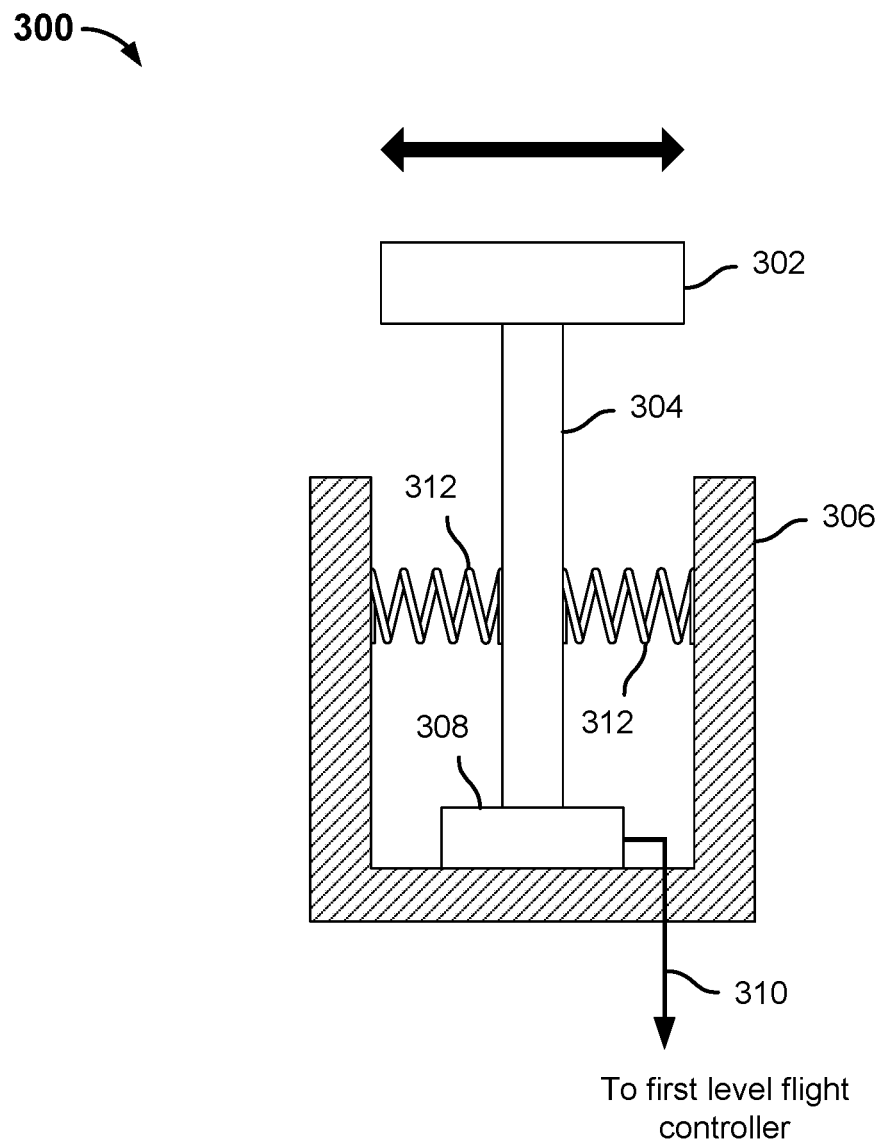
FIG. 3 is a block diagram illustrating an embodiment of a thumb-operated joystick device.

FIG. 3 is a block diagram illustrating an embodiment of a thumb-operated joystick device. In various embodiments, a thumb-operated miniature joystick, such as the joystick 300 of FIG. 3, may be used as an inceptor, such as inceptor(s) 202 of FIG. 2, to control an aircraft via manipulation by a user. In the example shown, joystick 300 includes a cap 302 mounted on a stick 304. Stick 304 extends into a housing 306 and is mounted to a base portion of housing 306 via a mount 308 that includes sensors configured to provide a signal 310 at levels (e.g., different voltage levels) determined based at least in part on a direction and/or magnitude of displacement to the cap 302 and upper end of stick 304 along an associated axis, e.g., as indicated by the double arrow shown above cap 302. For example, in some embodiments, FIG. 3 may show a side view and the double arrow may be associated with forward/aft manipulation of the cap 302. In some embodiments, such forward/aft manipulation may be associated with a throttle input/control.

Referring further to FIG. 3, the stick 304 is shown to be spring loaded, as represented by springs 312 in the example shown, such that the stick 304 tends to return to a center or other neutral position, in this example a vertical/upright position of stick 304 as shown. In various embodiments, an inceptor may be configured to tend to return to a center or neutral position by one or more springs or other structures.

In various embodiments, the signal 310 of FIG. 3 may correspond to an inceptor input, such as the input(s) 204 of FIG. 2. In various embodiments, a mapping of a level of signal 310 associated with a center position of the inceptor 300, such as the position as shown in FIG. 3, may be adjust dynamically as disclosed herein, e.g., to maintain altitude by remapping the center position to a throttle level the user has maintained over a sampling period, such as the past 4 seconds.

Figure 4:
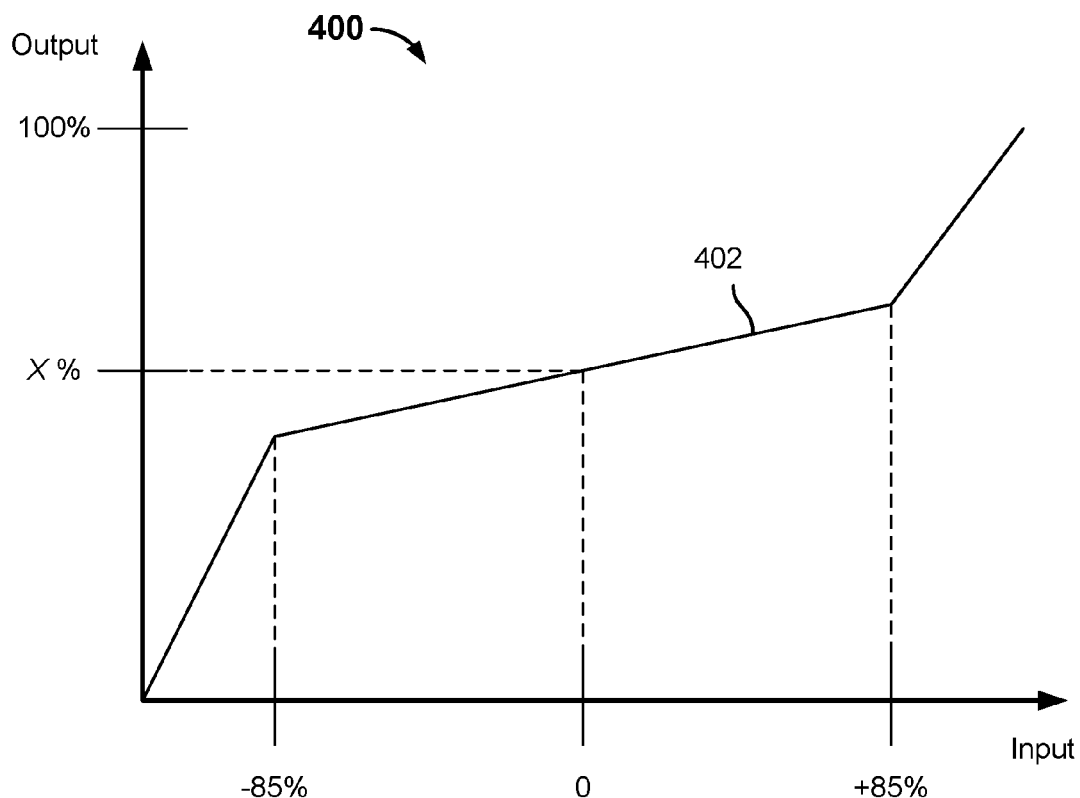
FIG. 4 is a block diagram illustrating an example mapping curve relating inceptor position to output in an embodiment of a flight control system.

FIG. 4 is a block diagram illustrating an example mapping curve relating inceptor position to output in an embodiment of a flight control system. In various embodiments, a mapping curve such as the mapping curve 400 of FIG. 4 may be used to map input levels received from one or more inceptor(s) to corresponding flight control signal levels, such as throttle. In the example shown, mapping curve 402 represents a piecewise linear function that comprises a first segment associated with a last 15% of displacement in a negative (e.g., rearward) direction, a second segment associate with displacements from −85% to +85%, and a third segment associated with displacements in a final 15% in the positive (e.g., forward) direction relative to center. The center position, represented in FIG. 4 by input level "0", is mapped to a corresponding output level that is "X" percent or X % of a maximum level. In some embodiments, in the case of a self-adjusting throttle control, the center position "0" may be mapped initially to a default value, e.g., 70% of maximum output. As the aircraft is flown, e.g., starting with take-off or beginning shortly thereafter, in various embodiments the mapping may be adjusted dynamically as disclosed herein such that the center or "0" position corresponds to a level $X_{avg}$ corresponding to a running average computed over a rolling window of fixed duration, such as the last 4 seconds.

Figure 5:
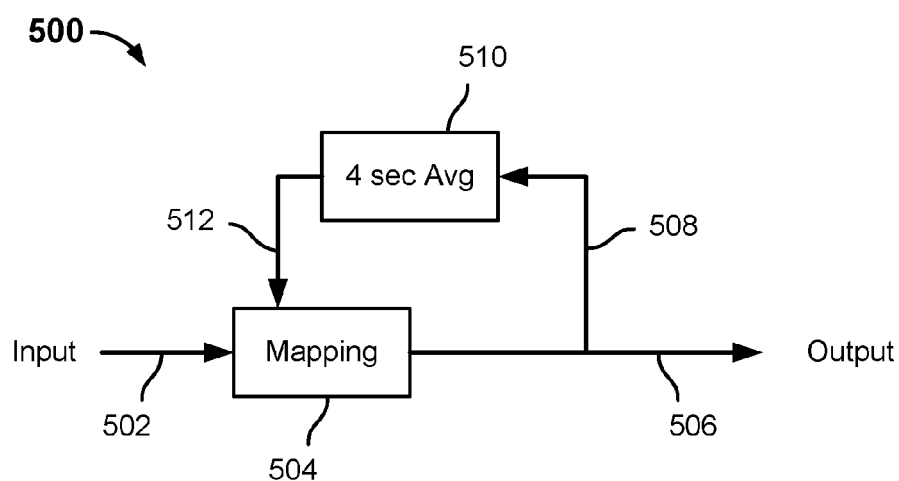
FIG. 5 is a block diagram illustrating an embodiment of a self-adjusting mapping module in an embodiment of a flight control system.

FIG. 5 is a block diagram illustrating an embodiment of a self-adjusting mapping module in an embodiment of a flight control system. In various embodiments, the mapping module 500 of FIG. 500 may be included in a first level flight controller, such as first level flight controller 206 of FIG. 2, and/or integrated into a primary flight controller, such as flight controller 210 of FIG. 2. In the example shown, mapping module 500 receives inputs 500 to a mapping component 504. Mapping component 504 may comprise one or more of a circuit, a programmed logic circuit (such as logic programmed into an FPGA or other device), and/or a software component running on a general purpose and/or a special purpose processor. Mapping component 504 maps the input levels 502 to corresponding output levels 506, e.g., a throttle level in the case of a self-adjusting throttle control. The output 506 is provided as feedback 508 to an averaging component 510 configured to compute a running average, e.g., over a rolling 4 second window. The computed average 512 is provided to mapping component 504, which in various embodiments uses the average to self-adjust the mapping of input signals 502 to output levels 506 such that the input level 502 associated with the center (or other neutral) position of the inceptor maps to a level determined based at least in part on the computed average 512.

In various embodiments, the mapping component 504 may be configured to self-adjust the mapping based on the average 512 at least in part by selecting and/or constructing a mapping curve based at least in part on the average 512. In some embodiments, the mapping component 504 may select (or construct) a mapping curve that is a member of a pre-defined family of mapping curves.

Figure 6:
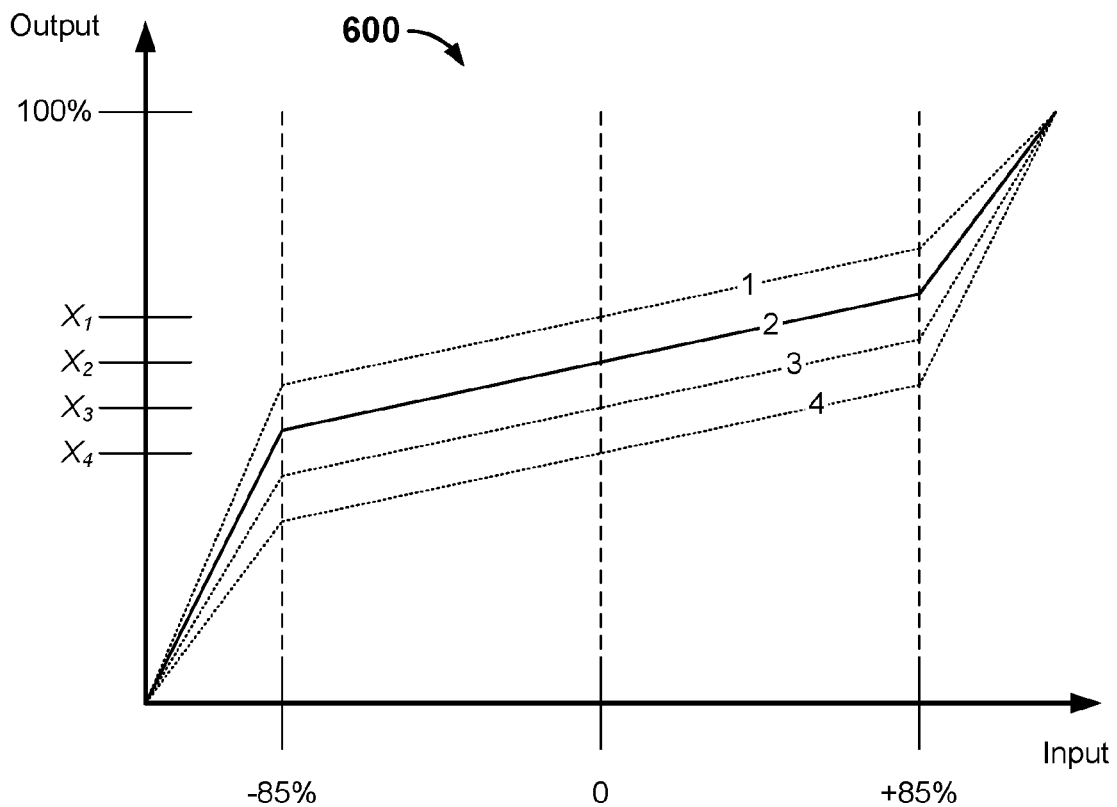
FIG. 6 is a block diagram illustrating an example of a family of mapping curves to relate inceptor position to output in an embodiment of a flight control system.

FIG. 6 is a block diagram illustrating an example of a family of mapping curves to relate inceptor position to output in an embodiment of a flight control system. In various embodiments, a mapping component or module, such as mapping component 504 of FIG. 5, may select and/or construct a member of/from a family of mapping curves, such as the family of curves 600 shown in FIG. 6, based at least in part on a computed running average output X. In the example shown, four members of the family, labeled "1", "2", "3", and "4", respectively, are shown. Each corresponds to an associated computed average output, labeled $X_1$, $X_2$, $X_3$, and $X_4$, respectively.

In the example shown, each member of the family has the same slope in a center (second) segment of mapping curve. In various embodiments, such an approach provides a similar response and/or user experience in response to movement of the inceptor through a substantial part of its range of motion, in this example corresponding to the −85% through +85% input levels. In this example, the first and third segments of the respective members of the family of mapping curves 600 have different slopes, to enable the minimum (0%) and maximum (100%) output (e.g., throttle) levels to be accessed regardless of the mapping curve being used.

In some embodiments, mapping may be self-adjusted by computing/constructing a piecewise linear function based on a received running average. For example, a fixed, preconfigured slope may be used for the middle segment such that the center or "0" position intersects the segment at an output level that equals or is computed based on the running average. Output levels for the −85% and +85% input levels may be computed, and the corresponding values used to compute respective slopes for the first and third segments such that the 0% and 100% output levels can be reach by the −100% and +100% inceptor input levels, respectively.

In some alternative embodiments, a predetermined set of curves is computed and a curve having a center/neutral value nearest the current value of the running average is used.

Figure 7:
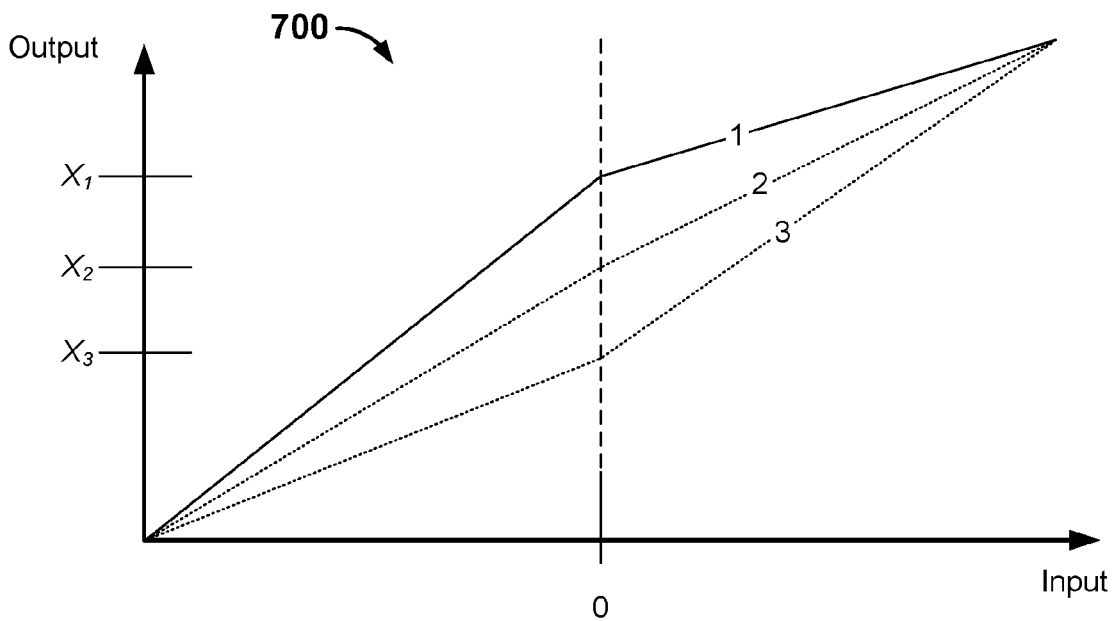
FIG. 7 is a block diagram illustrating an example of a family of mapping curves to relate inceptor position to output in an embodiment of a flight control system.

FIG. 7 is a block diagram illustrating an example of a family of mapping curves to relate inceptor position to output in an embodiment of a flight control system. In the example shown, each member of the family 700 includes just two segments, each selected and/or computed such that the "0" position of the inceptor corresponds to a current value of the running average output "X", the first segment runs from the origin to the point corresponding to the center position and average output X, and the second segment runs from the average output X to a point associated with 100% input and 100% output.

While specific families of mapping curves are shown in FIGS. 6 and 7, other families of mapping curves may be used in various embodiments.

Figure 8:
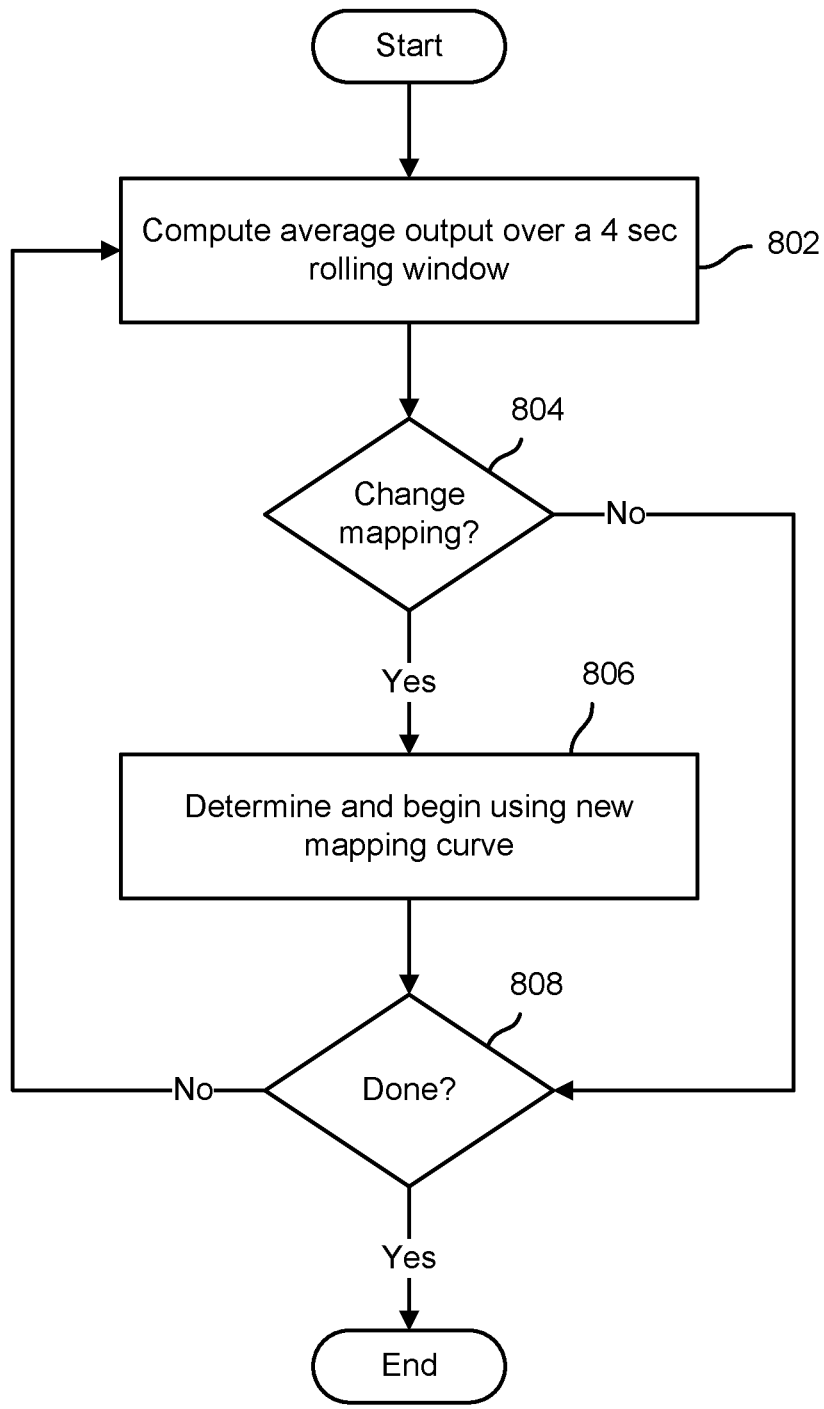
FIG. 8 is a flow chart illustrating an embodiment of a process to dynamically adjust mapping of flight control manual input to output in an embodiment of a flight control system.

FIG. 8 is a flow chart illustrating an embodiment of a process to dynamically adjust mapping of flight control manual input to output in an embodiment of a flight control system. In various embodiments, a mapping module and/or other component comprising a flight controller, such as first level flight controller 206 of FIG. 2 and/or a flight controller such as flight controller 210 of FIG. 2, may implement the process of FIG. 8. In the example shown, a running average output is computed, in this example over a 4 second rolling window (802). If a criteria(on) to adjust the mapping of inceptor input to associated output is satisfied (804), a new mapping curve is determined (e.g., selected, computed, etc.) and used (806). Otherwise, the current mapping curve continues to be used (804, 808).

In various embodiments, the mapping may be adjusted (804, 806) every time the running average changes or in some embodiments only if the change is greater than a threshold amount. In some embodiments, changes that occur during a prescribed and/or detected period of transition, such as takeoff, landing, or both, may be ignored (804, 808). In some embodiments, a transition period may be detected by determining a rate of change of one or both of the inceptor input and the corresponding output. For example, a first derivative may be computed and if the value is greater than a prescribed threshold the self-adjusting feature may be suppressed.

Figure 9:
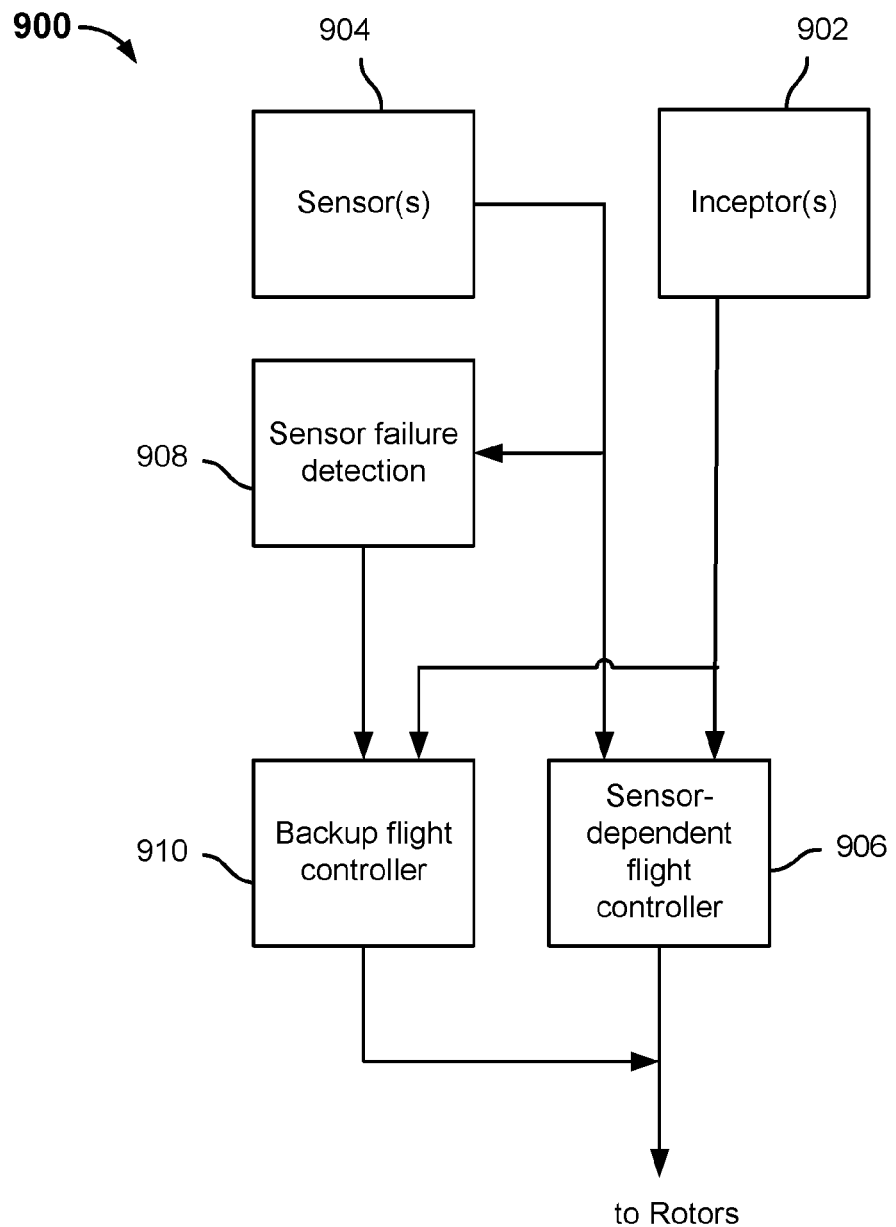
FIG. 9 is a block diagram illustrating an embodiment of a flight control system.

FIG. 9 is a block diagram illustrating an embodiment of a flight control system. In various embodiments, the flight control system 900 of FIG. 9 may be used to provide altitude control using altitude sensors, as a first order control, and using a self-adjusting flight control as disclosed herein as a backup, e.g., configured for use in the event of failure of the sensor-based control. In the example shown, one or more inceptors 902 provide inputs to a sensor-dependent flight controller 906. Sensor-dependent flight controller 906 uses inputs from the inceptor(s) 902 and inputs from sensors 904 to control flight, e.g., to maintain altitude. A sensor failure detection circuit or module (e.g., software) 908 is configured to receive signals provided by sensors 904 and to detect sensor failures based on analysis (or loss) of such signals. Upon detection of a critical sensor failure (e.g., loss of GPS or altimeter based altitude input, with insufficient back up from other sensors), in various embodiments sensor failure detection circuit or module 908 prompts a sensor-independent backup flight controller 910 to take over from sensor-dependent flight controller 906. In various embodiments, backup flight controller 910 may use techniques disclosed herein to achieve/approximate altitude hold (or other desired aircraft response/behavior) without requiring altitude (or other) sensors.

While in a number of examples described herein a self-adjusting flight control system as disclosed herein is used to achieve/approximate altitude hold without relying on sensors, in various embodiments techniques disclosed herein may be used to self-adjust a flight control system such that a center or other neutral position of an inceptor is remapped dynamically to be mapped to a computed average output value other than a throttle (or other) output value associated with maintaining a current altitude.

Figure 10:
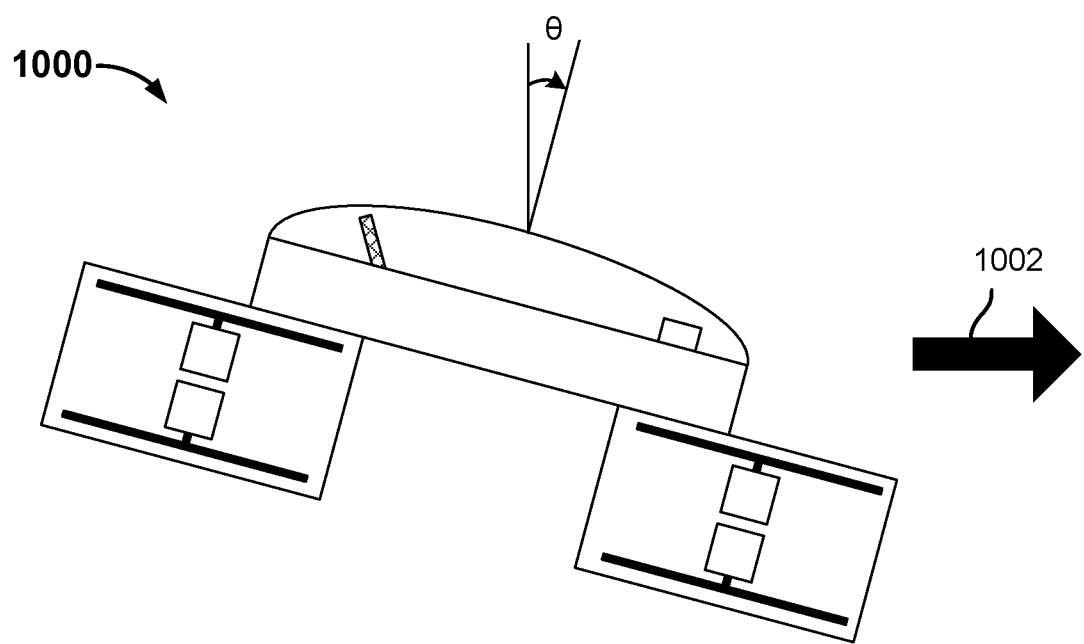
FIG. 10 is a block diagram illustrating an example of an aircraft in forward flight.

FIG. 10 is a block diagram illustrating an example of an aircraft in forward flight. In the example shown, the aircraft 1000 is shown in a forward pitched position such that the fixed pitch rotors drive the aircraft in a forward direction 1002. In various embodiments, techniques disclosed herein may be used to the mapping of inceptor input levels to corresponding output levels such that the respective center or other neutral position(s) of one or more manual flight controls is/are mapped to corresponding computed running average output level(s).

Using techniques disclosed herein, the complexity of controlling flight may be reduced by dynamically and automatically adjusting the mapping of inceptor input levels to associated output levels, e.g., such that a center or other neutral position of an inceptor may be mapped to a corresponding computed running average of output levels. Desired aircraft behavior, such as altitude hold, may be achieved (or approximated) in various embodiments, without relying on altitude or other sensors, which may be prone to failure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A flight control system, comprising:
an inceptor comprising an input device configured to receive manual input in the form of manual movement of the input device from a neutral position to which the input device returns when no manual input is being provided, wherein the inceptor is configured to provide a corresponding inceptor output signal representative of a position of the input device relative to the neutral position as a result of the manual input;
an input interface configured to receive an input signal corresponding to the inceptor output signal generated by the inceptor based at least in part on the position of the input device comprising the inceptor relative to the neutral position as a result of the manual input; and
a processor coupled to the input interface and configured to:
determine dynamically a mapping to be used to map input signals received from the inceptor to corresponding output signals of the flight control system; and
use the determined mapping to map the input signal to a corresponding output signal of the flight control system;
wherein the neutral position of the input device is mapped initially to a default value and the processor is configured to determine the mapping at least in part by computing a running average of the output signal over an averaging period and adjusting the mapping at least in part to associate the neutral position of the input device comprising the inceptor with a corresponding output level that is determined at least in part by the computed running average and is different than the default value.

2. The flight control system of claim 1, wherein the inceptor comprises a throttle control and the corresponding output signal comprises a throttle level.

3. The flight control system of claim 1, wherein the running average is computed over a four second averaging period.

4. The flight control system of claim 1, wherein the processor is configured to adjust said mapping dynamically based at least in part on a determination that a criterion to adjust the mapping has been satisfied.

5. The flight control system of claim 4, wherein the criterion comprises one or more of the following: any change in the computed running average; a change in the computed running average that is greater than a corresponding threshold; absence of an indication that one or both of the input signal and the corresponding output signal have been changing at greater than a threshold rate of change; and absence of an indication that the aircraft is taking off, landing, or otherwise being flown intentionally to a new altitude.

6. The flight control system of claim 1, wherein the processor is configured to determine the mapping at least in part by adjusting the mapping to associate the neutral position of the input device comprising the inceptor with a corresponding output level that is equal to the computed running average.

7. The flight control system of claim 1, wherein the processor is configured to determine the mapping at least in part by constructing a piecewise linear function based at least in part on the computed running average of the output signal.

8. The flight control system of claim 7, wherein the piecewise linear function includes a central segment, associated with the neutral position, and said central segment has a same prescribed slope through at least a range of values of the computed running average of the output signal.

9. The flight control system of claim 1, wherein the neutral position comprises a center position.

10. The flight control system of claim 1, wherein the neutral position comprises a position to which the input device is configured to return upon being released.

11. The flight control system of claim 1, wherein the output signal comprises a throttle signal associated with a plurality of rotors configured to control aircraft altitude.

12. The flight control system of claim 1, wherein the processor is configured to determine and use said mapping to map the input signal to the corresponding output signal based at least in part on an indication of a failure of a sensor relied on by a primary flight controller to provide altitude hold.

13. A method to control flight, comprising:
    receiving via an input interface an input signal generated by an inceptor comprising an input device configured to receive manual input in the form of manual movement of the input device from a neutral position to which the input device returns when no manual input is being provided, wherein the inceptor is configured to provide a corresponding inceptor output signal representative of a position of the input device relative to the neutral position as a result of the manual input;
    determining dynamically a mapping to be used to map input signals received from the inceptor to corresponding output signals associated with flight control; and
    using the determined mapping to map the input signal to a corresponding output signal;
    wherein the neutral position of the input device is mapped initially to a default value and the mapping is determined at least in part by computing a running average of the output signal over an averaging period and adjusting the mapping at least in part to associate the neutral position of the input device comprising the inceptor with a corresponding output level that is determined at least in part by the computed running average and is different than the default value; and
    wherein one or more of an attitude, altitude, and speed of an aircraft are maintained based on the corresponding output signal.

14. The method of claim 13, wherein the inceptor output signal comprises a throttle control signal and the corresponding output signal comprises a throttle level.

15. The method of claim 13, wherein the running average is computed over a four second averaging period.

16. The method of claim 13, wherein said mapping is adjusted dynamically based at least in part on a determination that a criterion to adjust the mapping has been satisfied.

17. The method of claim 16, wherein the criterion comprises one or more of the following: any change in the computed running average; a change in the computed running average that is greater than a corresponding threshold; absence of an indication that one or both of the input signal and the corresponding output signal have been changing at greater than a threshold rate of change; and absence of an indication that the aircraft is taking off, landing, or otherwise being flown intentionally to a new altitude.

18. The method of claim 13, wherein the mapping is determined at least in part by adjusting the mapping to associate the neutral position of the input device comprising the inceptor with a corresponding output level that is equal to the computed running average.

19. The method of claim 13, wherein the mapping is determined at least in part by constructing a piecewise linear function based at least in part on the computed running average of the output signal.

20. A computer program to control flight, the computer program product being embodied in a non-transitory computer readable medium and comprising computer instructions for:
    receiving via an input interface an input signal generated by an inceptor comprising an input device configured to receive manual input in the form of manual movement of the input device from a neutral position to which the input device returns when no manual input is being provided, wherein the inceptor is configured to provide a corresponding inceptor output signal representative of a position of the input device relative to the neutral position as a result of the manual input;
    determining dynamically a mapping to be used to map input signals received from the inceptor to corresponding output signals associated with flight control; and
    using the determined mapping to map the input signal to a corresponding output signal;
    wherein the neutral position of the input device is mapped initially to a default value and the mapping is determined at least in part by computing a running average of the output signal over an averaging period and adjusting the mapping at least in part to associate the neutral position of the input device comprising the inceptor with a corresponding output level that is determined at least in part by the computed running average and is different than the default value; and
    wherein one or more of an attitude, altitude, and speed of an aircraft are maintained based on the corresponding output signal.

* * * * *